United States Patent [19]
Amrany et al.

[11] Patent Number: 6,067,316
[45] Date of Patent: May 23, 2000

[54] CIRCUIT FOR COMBINED XDSL AND OTHER SERVICES

[75] Inventors: Danny Amrany, Wayside; Arnold Muralt, Fair Haven; Laszlo Arato, Hazlet, all of N.J.

[73] Assignee: Globespan, Inc., Red Bank, N.J.

[21] Appl. No.: 08/974,395

[22] Filed: Nov. 19, 1997

[51] Int. Cl.[7] ..................................................... H04B 1/38
[52] U.S. Cl. ........................... 375/220; 370/464; 379/399
[58] Field of Search .................... 375/219, 220, 375/259, 295, 316; 370/494, 464, 480, 538; 379/399; 395/200.6

[56] References Cited

U.S. PATENT DOCUMENTS

| | | | |
|---|---|---|---|
| 5,623,513 | 4/1997 | Chow et al. | 375/219 |
| 5,742,527 | 4/1998 | Rybicki et al. | 364/705.05 |
| 5,757,803 | 5/1998 | Russell et al. | 370/494 |
| 5,781,728 | 7/1998 | Rybicki et al. | 395/200.6 |
| 5,889,856 | 3/1999 | O'Toole et al. | 379/399 |
| 5,909,445 | 6/1999 | Schneider | 370/468 |
| 5,991,311 | 11/1999 | Long et al. | 370/524 |

*Primary Examiner*—Stephen Chin
*Assistant Examiner*—Chieh M. Fan
*Attorney, Agent, or Firm*—Thomas, Kayden, Horstemeyer & Risley

[57] ABSTRACT

A system and method for a communication to communicate both POTS and XDSL are provided. In accordance with one aspect of the invention, in improved central office line card circuit is provided, wherein the line card circuit includes a two-wire signal line for electrical connection with a two-wire local loop. A line interface card interfaces with the local loop and includes a bi-directional line for bi-directional communication with the signal line. In addition, the line interface circuit further has an input line and an output line. A first channel has an output electrically connected to the input line of the line interface circuit, and the first channel has inputs for both a pulse code modulation (PCM) input and a xDSL input. Similarly, a second channel has an input that is electrically connected to the output line of the line interface circuit. In addition, the second channel has outputs for both a PCM output and a xDSL output. An analog to digital converter is electrically interposed between the second channel input and the second channel PCM and xDSL outputs, and is operative to process (i.e., convert from analog to digital) shared PCM and xDSL signals. Finally, a digital to analog converter is electrically interposed between the first channel output and the first channel PCM and xDSL inputs. The digital to analog converter is similarly operative to process shared PCM and xDSL signals.

27 Claims, 5 Drawing Sheets

CIRCUIT FOR COMBINED XDSL AND OTHER SERVICES

BACKGROUND OF THE INVENTION

1. Field of the Invention

The present invention generally relates to communication systems, and more particularly, to improved line interface circuitry providing more efficient component utilization at a central office of a telecommunications system.

2. Discussion of the Related Art

In recent years telephone communication systems have expanded from traditional plain old telephone system (POTS) communications to include high-speed data communications as well. As is known, POTS communications includes not only the transmission of voice information, but also PSTN (public switched telephone network) modem information, control signals, and other information that is transmitted in the POTS bandwidth, which extends from approximately 300 hertz to approximately 3.4 kilohertz.

New, high-speed data communications provided over digital subscriber lines, such as Asymmetric Digital Subscriber Line (ADSL), Rate Adaptive Digital Subscriber Line (RADSL), etc. (more broadly denoted as xDSL) provide for high speed data transmissions, as is commonly used in communicating over the Internet. As is known, the bandwidth for xDSL transmissions is generally defined by a lower cutoff frequency of approximately 30 kilohertz, and a higher cutoff frequency which varies depending upon the particular technology. Since the POTS and xDSL signals are defined by isolated frequency bands, both signals may be transmitted over the same two-wire loop.

A POTS splitter is typically provided at each end of a transmission system communicating both POTS and xDSL information. As is known, a POTS splitter circuit consists of a high-pass filter and a low-pass filter, which are used to separate the two signals (the POTS signal from the xDSL signal). Normally, the high-pass filter is built into the xDSL transceiver, whereas the low-pass filter (commonly referred to as a POTS filter) normally provided as a separate unit. In operation, the POTS filter operates to filter the high frequency xDSL signals in order to protect the POTS (e.g., telephone) circuitry. At the same time the POTS filter provides filtering and protection for higher frequency noise signals that are often associated with a ring signal, or the switching circuitry of a central office.

A "line-card", containing line interface circuitry, is provided at the central office. The line interface circuitry provides the interconnections among xDSL circuitry, POTS or PSTN voice circuitry, off-hook (or tip/ring) detection circuitry, ring generator circuitry, and the local loop. As is known, the line interface circuitry includes a POTS filter that is interposed between the various POTS circuits and the xDSL circuit. This filter protects the POTS circuitry from the high frequency signals of the xDSL transmission circuitry. It also serves to minimize noise transmissions across the local loop from the central office to the customer premises.

As is known, upon entering a line card offering both POTS and xDSL services, the local loop splits into at least two distinct channels: a POTS channel and an xDSL channel. The POTS channel is buffered by a low-pass POTS filter from the higher frequency xDSL signals. Similarly, the xDSL channel is typically buffered by either a band-pass filter or a high-pass filter defined by a pass band to filter signals in the lower frequency POTS band. Beyond these filters, the two channels (i.e., the POTS channel and the xDSL channel) have similar features. For example, each channel is further split into a transmit side and a receive side. The transmit side of each channel typically includes a digital to analog converter, while the receive side includes a companion analog to digital converter. Using these converters, outgoing signals for transmission over the local loop are converted from digital to analog format. In the same way, incoming signals received from the local loop are converted from analog to digital format, so that they are placed in a form suitable for passing through a digital switch at the central office, or alternatively for processing by a digital signal processor (DSP).

It is recognized that the circuitry provided on many central office line cards is unduly duplicative. Accordingly, it is desired to design an improved line card circuit having reduced component count. Advantageously, such an improved circuit design would necessarily result in lower implementation costs and improved reliability.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a communication system configured to communicate both POTS and xDSL. In accordance with one aspect of the invention, an improved central office line card circuit is provided. In accordance with this embodiment, the line card circuit includes a two-wire signal line for electrical connection with a two-wire local loop. A line interface card interfaces with the local loop and includes a bidirectional line for bi-directional communication with the signal line. In addition, the line interface circuit includes an input line and an output line. A first or transmit channel has an output electrically connected to the input line of the line interface circuit, and the first channel has inputs for both a pulse code modulation (PCM) input and a xDSL input. Similarly, a second or receive channel has an input that is electrically connected to the output line of the line interface circuit. In addition, the second channel has outputs for both a PCM output and a xDSL output. An analog to digital converter is electrically interposed between the second channel input and the second channel PCM and xDSL output, and is operative to process (i.e., convert from analog to digital) shared PCM and xDSL signals. Finally, a digital to analog converter is electrically interposed between the first channel output and the first channel PCM and xDSL inputs. The digital to analog converter is similarly operative to process shared PCM and xDSL signals.

It will be appreciated that, consistent with the concepts and teachings of the present invention, other signal circuitry may be combined. For example, consistent with the teachings herein, it will be appreciated that the inventive concepts are readily extended to cover combined circuitry for both ISDN and xDSL. While the motivation for the invention was the efficiencies gained and savings achieved through the combination of POTS and xDSL circuitry, ISDN circuitry and xDSL circuitry may be combined in much the same way as the POTS and xDSL circuitry described herein. Since, however, the presently preferred embodiment is concerned with combining POTS circuitry with xDSL circuitry, the description herein frequently refers to PCM data or to a PCM input or output. It will be appreciated that this PCM interface will necessarily be adapted for an embodiment that combines ISDN and xDSL circuitry.

Further, more specific features are provided in connection with the preferred embodiment of the invention. Namely, the preferred embodiment includes a means for combining the PCM input and the xDSL input. This means may be an adder, or, alternatively, may be some other more complicated signal processing technique. In fact, the means may be performed in discrete logic, or may be implemented by way of a segment of executable code configured to control the combination of the PCM input and the xDSL input. The preferred embodiment also includes a compression means disposed between the PCM input and the means for combining. Like the means for combining, the compression means may be implemented by way of a discrete adder, or alternatively may be implemented through a segment of executable code configured to control the compression of the PCM input.

It will be further appreciated that the preferred embodiment may incorporate an echo estimation and cancellation mechanism. The implementation of such a mechanism will be through techniques known by those in the art, and will preferably be disposed between the xDSL input and the xDSL output. The preferred embodiment may further include a first order equalization filter disposed between the output line of the line interface circuit and the analog to digital converter. Further still, the preferred embodiment may include a programmable gain amplifier disposed between the output line of the line interface circuit and the analog to digital converter. A band-pass filter may be disposed between the analog to digital converter and the xDSL output in order to filter the xDSL signal from the shared PCM and xDSL signal. Similarly, a low-pass filter may be disposed between the analog to digital converter and the xDSL output, in order to filter the PCM signal from the shared PCM and xDSL signal.

In accordance with another aspect of the present invention, a method is provided for communicating both POTS and xDSL signals in a central office of a communications system. Preferably, the method includes the steps of receiving both PCM and xDSL signals at a central office line card and combining the PCM and xDSL signals into a single signal. It then converts the single signal from digital to analog form and sends the converted signal to a line interface circuit for communication to a local loop. In similar fashion, the method preferably receives a second combined signal from a local loop and sends the second combined signal from the line interface circuit to an analog to digital converter. Then, the preferred method separates the combined xDSL and PCM signals from the combined signal for separate transmission. It will be appreciated that better performance and lower cost is achieved by combining the PCM and xDSL signals in the digital domain, than achieved if the signals are combined in the analog domain.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Figure 1:
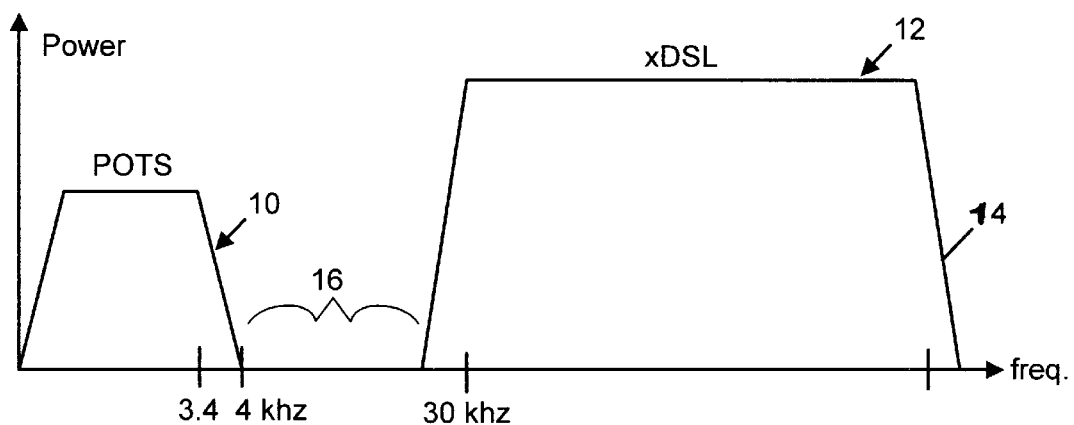
FIG. 1 is a graph showing the power spectrum for POTS and xDSL transmission bands.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Turning now to the drawings, FIG. 1 shows the spectrum allocation for both POTS and xDSL signals. Specifically, the graph is a plot of frequency on the horizontal axis and power on the vertical axis. As is known, the POTS frequency band 10 generally extends from approximately 300 hertz to approximately 3.4 kilohertz. The xDSL frequency band 12 generally extends from approximately 30 kilohertz up to an upper boundary 14, which varies depending upon the particular digital subscriber line technology utilized. A separation or guard band 16 provides some margin of signal separation, and thus noise and cross-talk immunity between signal transmissions between the POTS 10 and xDSL 12 frequency bands.

Figure 2:
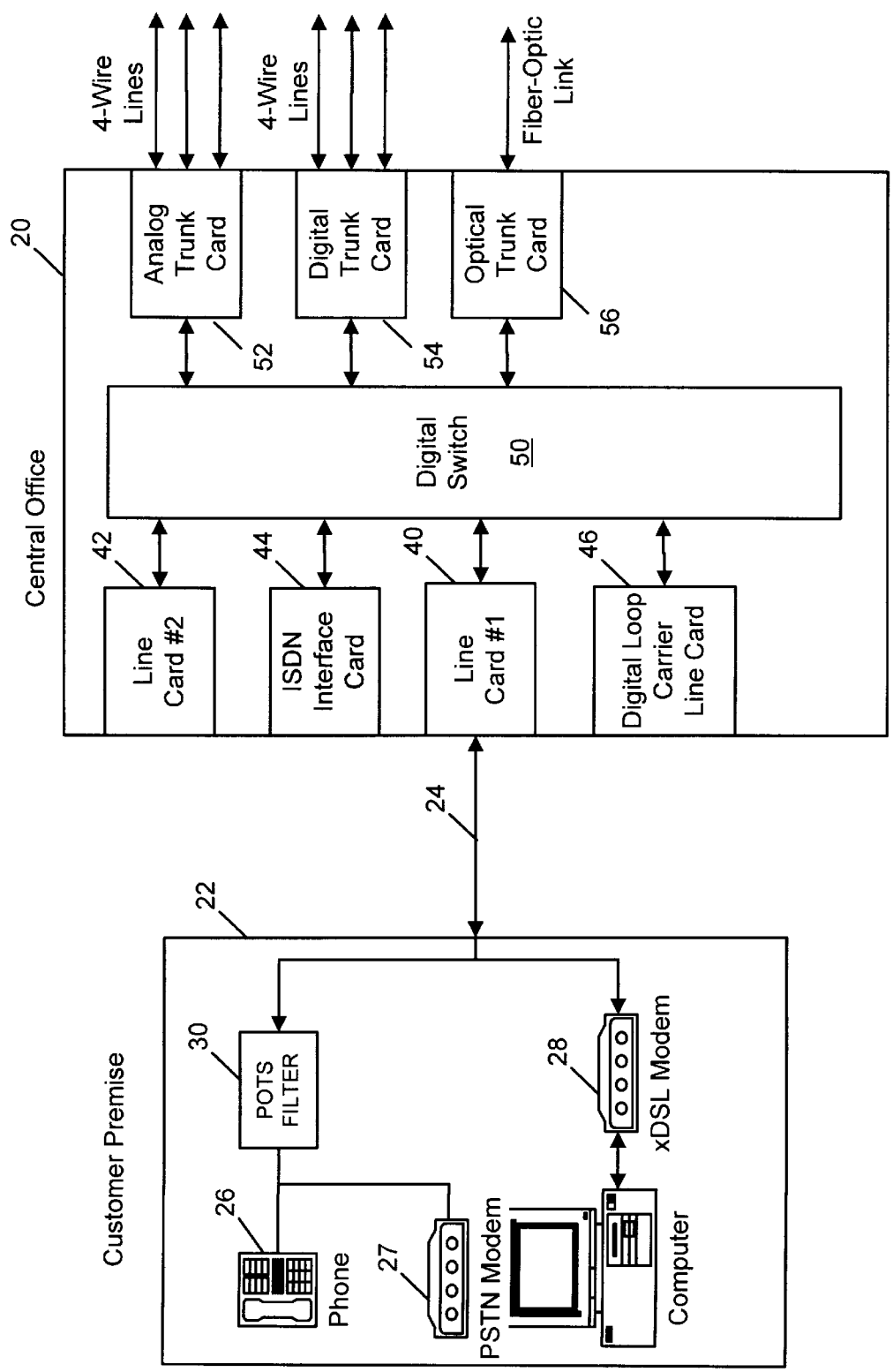
FIG. 2 is a block diagram illustrating the principal components of a prior art telecommunication system, at both the central office and customer premises.

Referring now to FIG. 2, a prior art communication system is shown. Specifically, FIG. 2 illustrates communication between a central office 20 and a customer premises 22 by way of local loop 24. While the customer premises 22 may be a single dwelling residence, a small business, or other entity, it is generally characterized as having POTS equipment, such as a telephone 26, PSTN modem 27, fax machine (not shown), etc. The customer premise 22 may also include an xDSL communication device, such as an xDSL modem 28. When an xDSL service is provided, a POTS filter 30 is interposed between the POTS equipment 26 and the local loop 24. As is known, the POTS filter 30 includes a low-pass filter having a cut-off frequency of approximately 4 kilohertz to 10 kilohertz, in order to filter high frequency transmissions from the xDSL communication device 28 and protect the POTS equipment.

At the central office 20, additional circuitry is provided. Generally, a line card 40 containing line interface circuitry is provided for electrical connection to the local loop 24. In fact, multiple line cards may be provided 40, 42 to serve a plurality of local loops. In the same way, additional circuit cards are typically provided at the central office 20 to handle different types of services. For example, an ISDN interface card 44, a digital loop carrier line card 46, and other circuits cards, for supporting similar and other communication services, may be provided.

A digital switch 50 is also provided at the central office 20 and is disposed for communication with each of the various line cards 40, 42, 44, 46. On the outgoing side of the central office (i.e., the side opposite the various local loops), a plurality of trunk cards 52, 54, 56 are typically provided. For example, an analog trunk card 52, a digital trunk card 54, and an optical trunk card 56 are all illustrated in FIG. 2. Typically, these cards have outgoing lines that support numerous multiplexed transmissions and are typically destined for other central offices or long distance toll offices.

Figure 3:
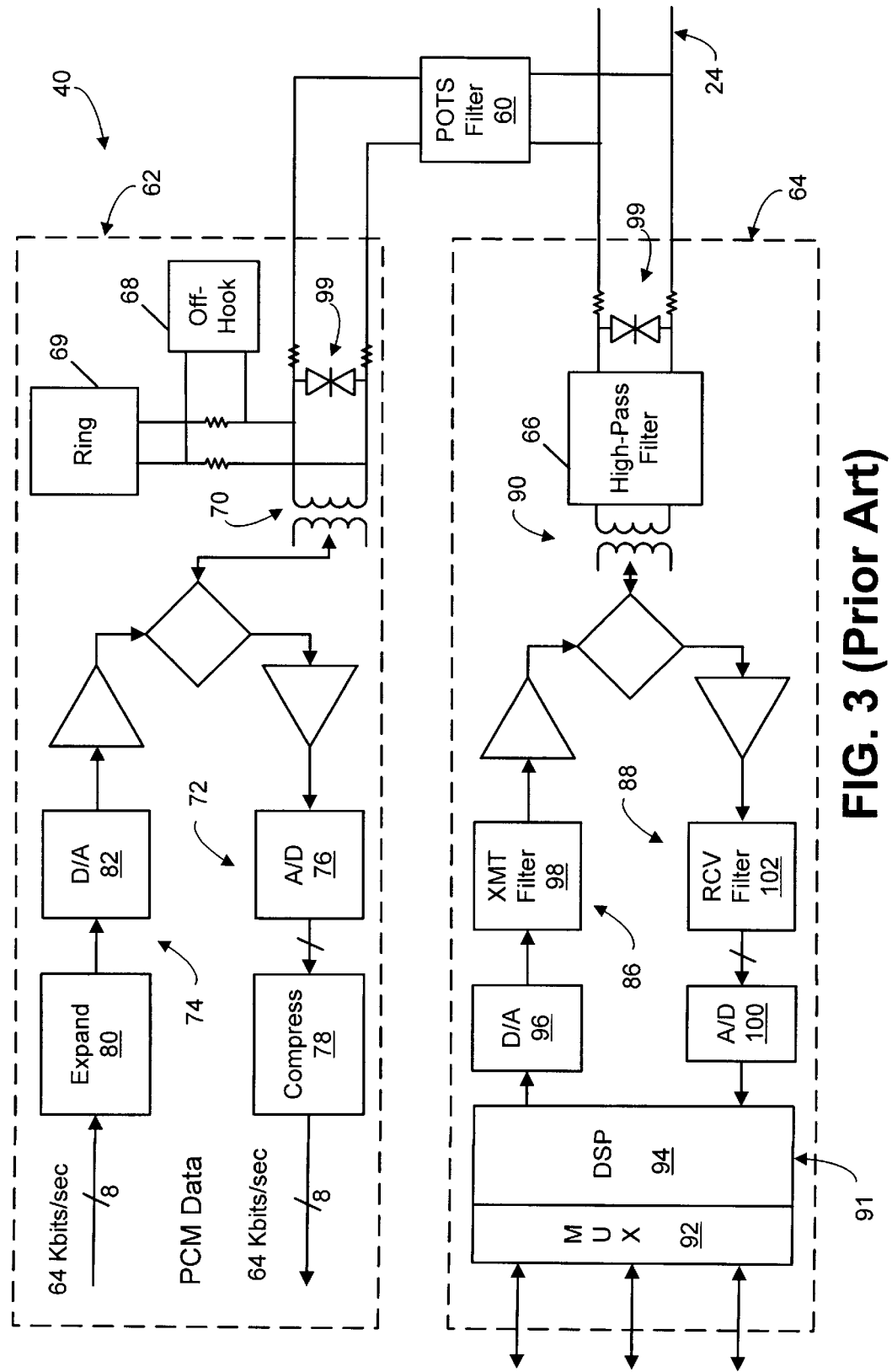
FIG. 3 is a block diagram more particularly illustrating the line card circuitry of a prior art system.

Having described a very basic layout of the central office architecture, reference is now made to FIG. 3, which is a block diagram illustrating the circuitry that is common to a line card 40 of a central office 20, providing both POTS and xDSL communication services to an end user across a local loop 24. As illustrated, the local loop 24 is tapped to split off into two distinct channels, separated by a POTS filter 60. The first channel, or POTS channel 62, handles the lower frequency, voice-band transmissions, while the second, or xDSL channel 64, handles the higher frequency data transmissions. As is known, the POTS filter 60 serves to filter out higher frequency xDSL data signals from reaching the POTS channel 62. At the same time, the POTS filter 60 filters various higher frequency noise signals, that may otherwise be present in a transmitted POTS signal, from reaching the local loop 24. In the same way, a high pass filter 66 is provided near the interface of the xDSL channel 64 and the local loop 24. This high pass filter 66 is designed to filter out the lower frequency noise and POTS band transmissions, and therefore prevent them from reaching the operational circuitry of the xDSL channel 64.

In the POTS channel 62, two lines come out of the POTS filter 60 and are tapped and fed to circuitry such as the off-hook detection 68 and ring generator 69. The off-hook detection circuitry 68 operates to detect at the central office when a user or subscriber has lifted a handset, such that a dial tone may be applied to the local loop 24. The ring generator circuit 69 operates to apply an approximately 20 hertz, 80 volt signal to the local loop 24, which causes the ringer to operate at the customer premises. These circuits operate in a manner that is well known and need not be described herein.

Similarly, in a manner that is understood by those skilled in the art, the two lines coming out of the POTS filter 60 are coupled (transformer-coupled in the illustrated embodiment, but may be coupled in other manners as well) and split apart at 70 within the POTS channel 62, by a subscriber line interface circuit (SLIC). Specifically, the signal is split apart into a receive side 72 and transmit side 74 of the POTS channel 62. A CODEC performs a signal conversion and translation in a manner that is known. Specifically, on the receive side 72 the CODEC operates to convert the signal received from the SLIC from analog to digital format with A/D converter 76, then translates/compresses the signal at 78, if required, in accordance with a mu-law or A-law algorithm. The pulse code modulation output data (digital) may then be delivered to the digital switch 50 (See FIG. 2) at a rate of 64 kilobits per second.

In similar fashion, PCM data may be received from the digital switch 50 on the transmit side 74 at a rate of 64 kilobits per second, expanded according to a mu-law or A-law algorithm at 80, and converted from digital to analog format using a D/A converter 82. This analog signal then may be applied at the subscriber line interface circuit to be applied through POTS filter 60 to the local loop 24. It will be appreciated that the mu-law or A-law compression/expansion that is performed in the CODEC is performed in a manner that is well known in the art.

Similarly, the xDSL channel 64 is divided into a transmit side 86 and receive side 88, which are similarly transformer coupled at 90 to the local loop 24. As is known, the higher speed xDSL data communications are used for wide variety of tasks, including Internet transmission, video conferencing, etc. Various signals may be fed by a digital switch 50 (See FIG. 2) into an access module 91. The access module 91 may include a multiplexer 92 that serves to time division multiplex the xDSL signals, if appropriate, and a digital signal processor 94 may also be included. The outgoing signal on the transmit side 86 is first processed by a digital to analog converter 96 then a transmit filter 98, before being applied to the local loop 24. Similarly, on the received side 88 receive signals are filtered at 102, then converted from analog to digital domain at 100, before being routed to the access module 91.

As is appreciated from the summary description provided above, line card circuits 40 presently known for implemented both POTS and xDSL services have a duplication in various circuit components. For example, each channel 62, 64 is divided into a receive side and transmit side. Each transmit side includes a digital to analog converter, and each received side includes an analog to digital converter. As is taught by the present invention, an improved circuit may be provided for the line card 40 that reduces component count by eliminating redundant circuitry. As a result, implementation costs are reduced and circuit reliability is improved.

Figure 4:
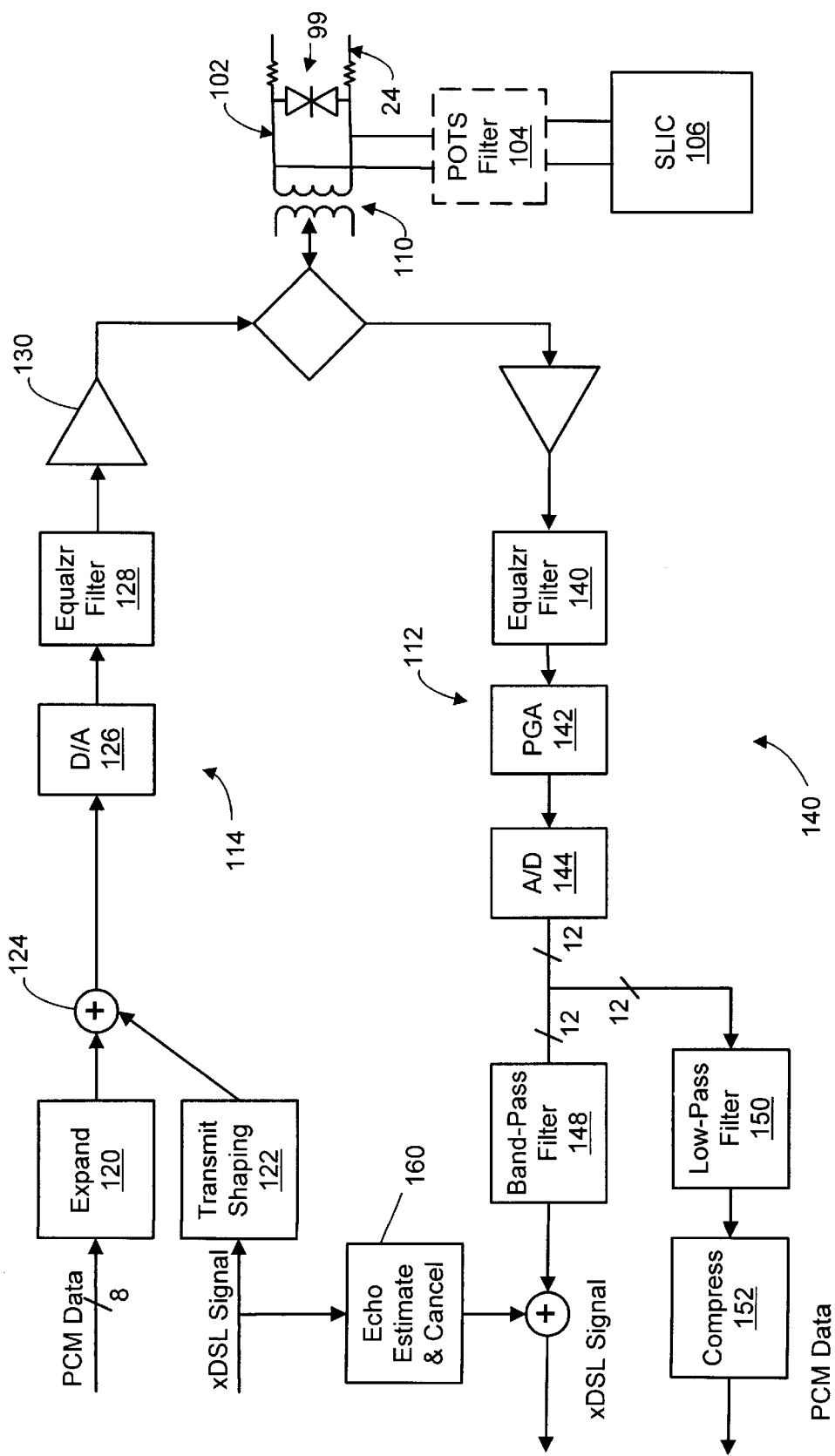
FIG. 4 is a block diagram illustrating the line card circuitry in accordance with the preferred embodiment of the present invention.

Reference is now made to FIG. 4, which is a block diagram illustrating the primary circuit design of an improved line card circuit in accordance with the concepts and teachings of the present invention. As illustrated, the tip and ring signals of the two wire local loop 24 are tapped off at 102 for connection to subscriber line interface circuitry 106. This circuitry will include off-hook detection circuitry, ring generation circuitry, line supervision circuitry, and other circuitry that is well known and understood in the art, and therefore need not be described herein. A POTS filter 104 may be provided for filtering any high frequency noise components both incoming and outgoing to the local loop 24. Although denoted as POTS filter 104, it will be appreciated that the cut off frequency of this filter may be different from that of a standard POTS filter, since voice information is not passed through this filter. This allows simplification of the POTS filter.

Again, in a manner that will be appreciated, and as illustrated in FIG. 3, the combined POTS and xDSL signals of the local loop 24 are transformer coupled (although they may be coupled in other fashions) at 110 for both transmission to and reception from the local loop 24. Unlike the circuitry of FIG. 3, however, the circuitry of the present invention is not subdivided into a POTS and xDSL channel. Rather, the POTS and xDSL signals are combined into a single channel having a first side (or transmit side) 114 and a second side (or receive side) 112. On the transmit side 114, digital PCM data is received from the digital switch 50 (See FIG. 2) and expanded according to an A-law or mu-law algorithm at 120. Similarly, the xDSL signal received from the digital switch 50 may be passed through a similar block 122 for any transmit shaping that may be necessary. These signals are then combined by adder 124 (or modulator) and delivered to a digital to analog converter 126. The outgoing analog signal is then passed through an equalization filter 128, which is filtered to provide greater emphasis on high frequency signals (by amplifying) than on the lower frequency, POTS signals. The signal output from the equalization filter 128 is then passed through line driver 130 and applied at 110 to the local loop 24. Alternatively, a PGA can be located before the adder.

In similar fashion, signals received from a subscriber end across local loop 24 are processed first by an equalization filter 140, which, like filter 128, will place frequency-dependent emphasis on the received signal. Then, the analog signal is passed through a programmable gain amplifier 142 and then an analog to digital converter 144. It will be appreciated that the programmable gain amplifier 140 operates to bring the received signal to a level that is compatible with the A/D converter 144, so as to get optimum utilization of the A/D converter. That is, if the A/D converter operates to convert signals in the analog domain ranging from 0 volts to 3 volts (arbitrarily) into the fill range of its digital output, then the programmable amplifier 140 operates to adjust the voltage levels of the receive signal fully within that 0 to 3 volt range.

The output of the analog to digital converter is routed to both an xDSL output and a PCM output. More specifically, the output is routed through two different filters: a band-pass filter (or high-pass filter) that operates to filter out the lower frequency voice band signals, and thus delivering signals within the xDSL frequency band to the xDSL output. Similarly, the output of the analog to digital converter is also routed through a low pass filter 150, which serves to filter out the higher frequency xDSL signals, as well as noise signals, to deliver only that information in the POTS or voice frequency band to the PCM output. After filtering out the PCM data, the digital signal is then compressed using a look up table or other device that performs a reciprocal compression (reciprocal to the expansion performed at block 120) at 152, in accordance with the A-law or mu-law compression/expansion algorithm.

It will appreciated that known concepts such as echo estimation and cancellation may be performed in the line card circuitry of the present invention, using procedures that are understood by those skilled in the art. For example, block 160 is illustrated as providing an echo estimation/cancellation function between the transmit side and receive side xDSL signal lines. Since echo cancellation is known in the art and need not be uniquely performed for implementation in connection with the present invention, it need not be described further herein, other than to recognize that it may be implemented in connection with the present invention.

It should be further appreciated that various efficiencies are realized by the circuitry of the present invention. For example, in the prior art circuitry illustrated in FIG. 3, separate analog to digital and digital to analog converters were provided for each of the POTS channel and xDSL channel circuits. In combining the POTS and xDSL signals, the resulting circuitry uses only a single digital to analog converter and analog to digital converter for operation on these combined signals. Likewise, line protection circuitry 99 is typically provided at the junction of the line card to the local loop. In the prior art system (See FIG. 3) this line protection circuitry was duplicated. However, the combined circuits of the present invention need only a single line protection circuit.

The foregoing description has been presented for purposes of illustration and description. It is not intended to be exhaustive or to limit the invention to the precise forms disclosed. Obvious modifications or variations are possible in light of the above teachings. For example, and as briefly noted above, the concepts and teachings of the present invention apply to more than merely combining POTS and xDSL circuitry, but may be readily extended to combine ISDN (for example) and xDSL circuitry in much the same way as described herein. Of course, certain modifications will need to be made for other implementations, but such modifications will be within the level of ordinary skill, in light of the teachings herein. In this regard, reference is made briefly to FIG. 5.

Figure 5:
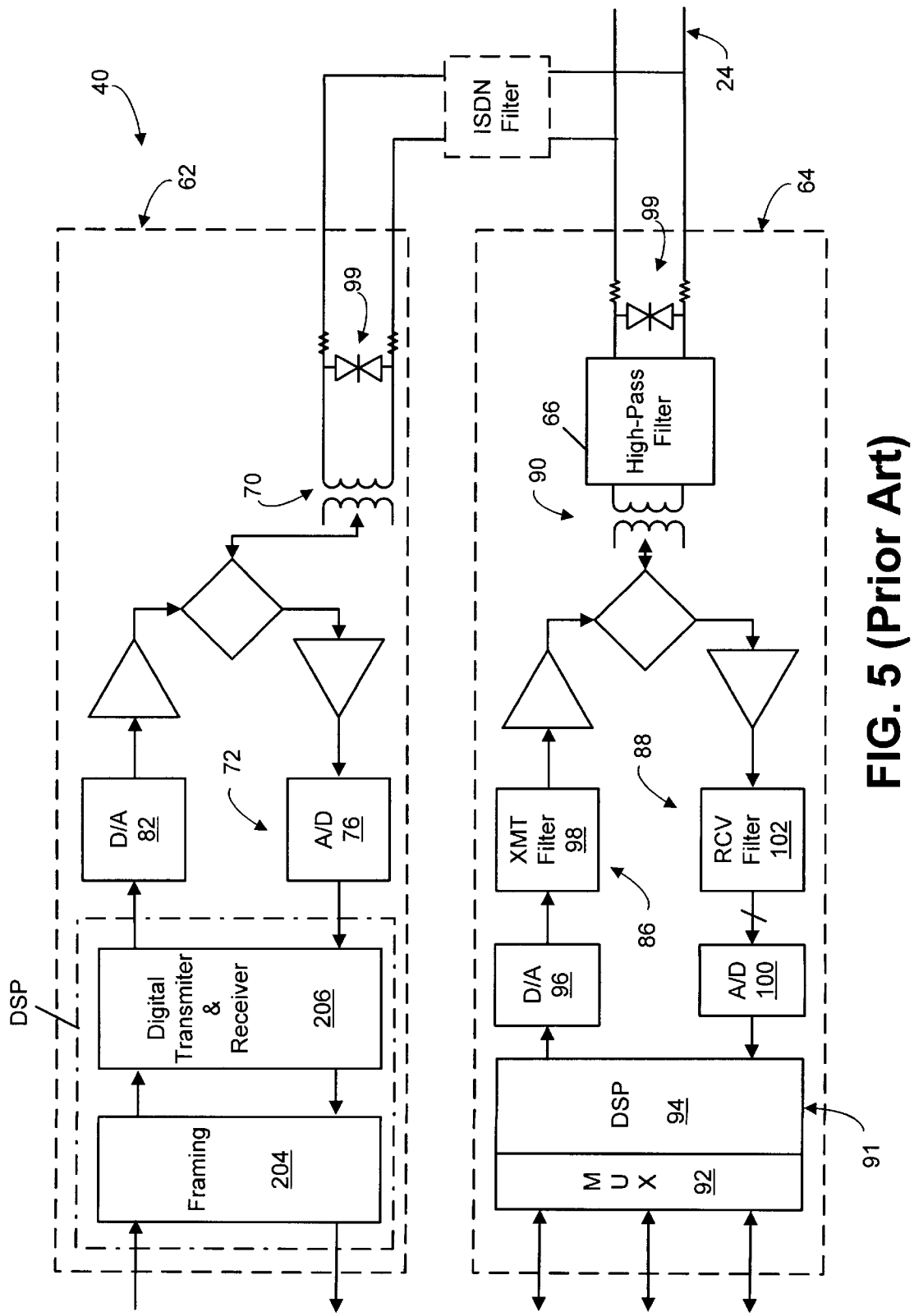
FIG. 5 is a block diagram similar to FIG. 3, but illustrating line card circuitry for ISDN instead of POTS.

For example, in combining ISDN and xDSL circuitry, the xDSL frequency band will preferably be shifted upwardly. In this regard, the upper frequency for POTS transmissions is approximately 3.4 kilohertz, whereas the lower frequency for xDSL transmission is typically about 30 kilohertz. However, the upper frequency for ISDN is typically about 80 kilohertz. Accordingly, to provide a greater guard band between the two frequency bands, it will generally be desired to upwardly shift the xDSL frequency band. As illustrated in FIG. 5, it is observed that the overall structure of the prior art ISDN circuitry is similar to the POTS circuitry, except that the ISDN circuitry includes in interface for framing 204 and a digital transmitter and receiver 206. Normally, these functions are performed by a DSP. It will be appreciated that combined ISDN and xDSL circuitry in accordance with the invention may be designed to implement this functionality along with the other digital processing within a single DSP. Also, FIG. 5 illustrates an ISDN filter in place of the POTS filter of FIG. 3. This filter may be desired if side-lobes of the ISDN transmissions interfere with the xDSL transmissions. This determination will be based in part upon the extent to which the xDSL frequency band is upwardly shifted. If shifted far enough, the ISDN filter may not be required.

In this regard, the embodiment or embodiments discussed herein were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. In a communication system configured to communicate both POTS and xDSL, a central office line card circuit comprising:

a two-wire signal line for electrical connection with a two-wire local loop;

a line interface circuit having a bi-directional line for bi-directional communication with the signal line, the line interface circuit further having an input line and an output line;

a first channel having an output electrically connected to the input line of the line interface circuit, the first channel having a pulse code modulation (PCM) input and a xDSL input;

a second channel having an input electrically connected to the output line of the line interface circuit, the second channel having a PCM output and a xDSL output;

an analog to digital converter electrically interposed between the second channel input and the second channel PCM and xDSL outputs, the analog to digital converter operative to process shared PCM and xDSL signals; and a digital to analog converter electrically interposed between the first channel output and the first channel PCM and xDSL inputs, the digital to analog converter operative to process shared PCM and xDSL signals.

2. The circuit of claim 1, further including a means for combining the PCM input and the xDSL input.

3. The circuit of claim 2, wherein the means for combining is an adder.

4. The circuit of claim 2, wherein the means for combining is a modulator.

5. The circuit of claim 2, wherein the means for combining includes a segment of executable code configured to control the combination of the PCM input and the xDSL input.

6. The circuit of claim 2, further including a compression means disposed between the PCM input and the means for combining.

7. The circuit of claim 6, wherein the compression means includes a portion a compander circuit.

8. The circuit of claim 6, wherein the compression means includes a segment of executable code configured to control the compression of the PCM input.

9. The circuit of claim 8, wherein the executable code is provided in connection with a digital signal processor.

10. The circuit of claim 1, further including an echo cancellation mechanism disposed between the xDSL input and the xDSL output.

11. The circuit of claim 1, further includes a first order equalization filter disposed between the output line of the line interface circuit and the analog to digital converter.

12. The circuit of claim 1, further including a programmable gain amplifier disposed between the output line of the line interface circuit and the analog to digital converter.

13. The circuit of claim 1, further including a band-pass filter disposed between the analog to digital converter and the xDSL output, the band-pass filter configured to filter the xDSL signal from the shared PCM and xDSL signal.

14. The circuit of claim 1, further including a low-pass filter disposed between the analog to digital converter and the xDSL output, the low-pass filter configured to filter the PCM signal from the shared PCM and xDSL signal.

15. In a communication system configured to communicate both POTS and xDSL, a central office line card circuit comprising:
a two-wire signal line for electrical connection with a two-wire local loop;
a line interface circuit having a bi-directional line for bi-directional communication with the signal line, the line interface circuit further having an input line and an output line;
a first channel having an output electrically connected to the input line of the line interface circuit, the first channel having a pulse code modulation (PCM) input and a xDSL input;
a second channel having an input electrically connected to the output line of the line interface circuit, the second channel having a PCM output and a xDSL output; and
an analog to digital converter electrically interposed between the second channel input and the second channel PCM and xDSL outputs, the analog to digital converter operative to process shared PCM and xDSL signals.

16. The circuit of claim 15, further including a digital to analog converter electrically interposed between the first channel output and the first channel PCM and xDSL inputs, the digital to analog converter operative to process shared PCM and xDSL signals.

17. The circuit of claim 15, further including a means for combining the PCM input and the xDSL input.

18. The circuit of claim 17, wherein the means for combining is an adder.

19. The circuit of claim 17, wherein the means for combining is a modulator.

20. The circuit of claim 17, wherein the means for combining includes a segment of executable code configured to control the combination of the PCM input and the xDSL input.

21. The circuit of claim 17, further including a compression means disposed between the PCM input and the means for combining.

22. The circuit of claim 21, wherein the compression means includes a portion a compander circuit.

23. The circuit of claim 21, wherein the compression means includes a segment of executable code configured to control the compression of the PCM input.

24. In a communication system configured to communicate both POTS and xDSL, a central office line card circuit comprising:
a two-wire signal line for electrical connection with a two-wire local loop;
a line interface circuit having a bi-directional line for bi-directional communication with the signal line, the line interface circuit further having an input line and an output line;
a first channel having an output electrically connected to the input line of the line interface circuit, the first channel having a pulse code modulation (PCM) input and a xDSL input;
a second channel having an input electrically connected to the output line of the line interface circuit, the second channel having a PCM output and a xDSL output; and
a digital to analog converter electrically interposed between the first channel output and the first channel PCM and xDSL inputs, the digital to analog converter operative to process shared PCM and xDSL signals.

25. The circuit of claim 24, further including an analog to digital converter electrically interposed between the second channel input and the second channel PCM and xDSL outputs, the analog to digital converter operative to process shared PCM and xDSL signals.

26. A method for communicating both POTS and xDSL signals in a central office of a communications system comprising the steps of:
receiving both PCM and xDSL signals at a central office line card;
combining the PCM and xDSL signals into a single signal;
converting the single signal from analog to digital form;
sending the converted signal to a line interface circuit for communication to a local loop;
receiving a second combined signal from a local loop;
sending the second combined signal from the line interface circuit to a digital to analog converter; and
separating the combined xDSL and PCM signals from the combined signal for separate transmission.

27. In a communication system configured to communicate both ISDN and xDSL, a central office line card circuit comprising:
a signal line for electrical connection with a local loop;
a line interface circuit having a bi-directional line for bi-directional communication with the signal line, the line interface circuit further having an input line and an output line;
a first channel having an output electrically connected to the input line of the line interface circuit, the first channel having an ISDN input and a xDSL input;
a second channel having an input electrically connected to the output line of the line interface circuit, the second channel having an ISDN output and a xDSL output;
an analog to digital converter electrically interposed between the second channel input and the second channel ISDN and xDSL outputs, the analog to digital converter operative to process shared ISDN and xDSL signals; and
a digital to analog converter electrically interposed between the first channel output and the first channel ISDN and xDSL inputs, the digital to analog converter operative to process shared ISDN and xDSL signals.

* * * * *